United States Patent [19]

Lyons

[11] Patent Number: 4,524,679
[45] Date of Patent: Jun. 25, 1985

[54] AIR VALVE
[75] Inventor: Harold W. Lyons, Deep River, Conn.
[73] Assignee: Whelen Engineering Co., Inc., Deep River, Conn.
[21] Appl. No.: 543,340
[22] Filed: Oct. 19, 1983
[51] Int. Cl.³ .............................................. F24F 13/10
[52] U.S. Cl. ..................................... 98/40.02; 251/352
[58] Field of Search ............ 98/2, 40 A, 41 R, 415 V; 251/352; 137/616.3

[56] References Cited

U.S. PATENT DOCUMENTS

| | | | |
|---|---|---|---|
| 2,056,757 | 10/1936 | Adamcikas | 98/40 A |
| 2,462,989 | 3/1949 | Mufich et al. | 98/40 A |
| 2,885,943 | 5/1959 | Divizia | 98/40 A |
| 3,113,502 | 12/1963 | Kallel et al. | 98/40 A |
| 3,319,927 | 5/1967 | Thompson | 251/352 X |

FOREIGN PATENT DOCUMENTS 351050  6/1931  United Kingdom ............... 98/40 A

Primary Examiner—Harold Joyce

[57] ABSTRACT

A valve for directing and controlling the flow of pressurized gas comprises a socket and a spheroidal hollow shell mounted in said socket for swivel motion. The shell interiorly forms a spheroidal socket which receives an axially rotatable valve body. The shell and the valve body respectively have an alignable aperture and gas inlet. The body and shell are rotatable between a closed position and an open position wherein the aperture aligns with the inlet.

17 Claims, 3 Drawing Figures

AIR VALVE

BACKGROUND OF THE INVENTION

This invention relates to the exercise of control over the volumn and direction of flow of gas from a pressurized source. More particularly, this invention relates to an air valve adapted for use in controlling and directing the flow of air between a pressurized chamber and the cabin of an aircraft.

The new and improved air valve of the present invention efficiently integrates a means to control the quantity of air flow from a pressurized chamber to an interior space, such as the cabin of an aircraft, with a means for directing the air flow toward a specific location within the interior space. U.S. Pat. No. 2,189,502 and Russian Pat. No. 462,747 disclose valves wherein a valve body is essentially universally movable within a fixed socket to control the flow of a pressurized gas. British Pat. Nos. 465,740 and 501,926 both generally disclose directionally adjustable air delivery devices employing a pair of substantially ball-shaped members which are relatively rotatable in planes normal to each other. U.S. Pat. No. 2,974,580 generally discloses an adjustable air outlet employing a substantially ball-shaped housing which is rotatable in a fixed socket, an air valve being mounted within the ball housing for reciprocal air control adjustment therein. The disclosures of the aforementioned patents are believed to exemplify the state-of-the-art to which the valve of the present invention generally pertains.

BRIEF SUMMARY OF THE INVENTION

Briefly stated, the invention in a preferred form is a valve for directing and controlling air flow from a pressurized source. The valve of the present invention comprises a socket means adapted to be connected to the exit opening of an air plenum or other source of pressurized gas. The socket means receives a hollow sheel for swivel motion within the socket. The hollow shell has a substantially truncated spheroidal shape and an aperture which communicates with the air plenum. The hollow shell also defines an interior spheroidal socket. A valve body is received in the spheroidal socket and axially rotates in the socket. The valve body has an air passage which extends from an air inlet to an air outlet. The air outlet is outwardly disposed relative to the shell. The body and shell are axially rotatable between a closed position wherein a portion of the valve body interiorly closes the aperture of the shell and an open position wherein the air outlet and aperture align. In the open position, the air valve provides an air flow from the aperture through the air outlet of the valve body.

The dimensions of the aperture are preferably substantially commensurate with the dimensions of the air inlet. The air passage is substantially elbow-shaped. The valve body includes an intermediate circumferential groove which receives a rim of the shell. Limit means may also be provided to limit the axial rotation between the body and shell to approximately 180 degree positions corresponding to the open and closed positions. The valve body preferably includes a spheroidal surface adjacent the air inlet. The spheroidal surface of the valve body is complementary with the interior surface of the spheroidal socket of the shell.

An object of the invention is to provide a new and improved valve for directing and controlling flow from a pressurized gas source to an interior space.

Another object of the invention is to provide a new and improved valve of relatively simple mechanical construction which is adapted for directing and controlling an airflow in an efficient and reliable manner.

Another object of the invention is to provide a new and improved valve having an efficient construction which substantially eliminates noise produced by the flow of pressurized gas therethrough.

A further object of the invention is to provide a new and improved valve wherein the pressure in a plenum to which the valve is coupled is employed to facilitate the sealing of the valve elements when the valve is in a closed position.

A further object of the invention is to provide a new and improved valve which is readily adaptable for manufacture employing components which are resistant to condensation buildup.

Other objects and advantages of the invention will become apparent from the drawing and detailed description.

DETAILED DESCRIPTION

Figure 1:
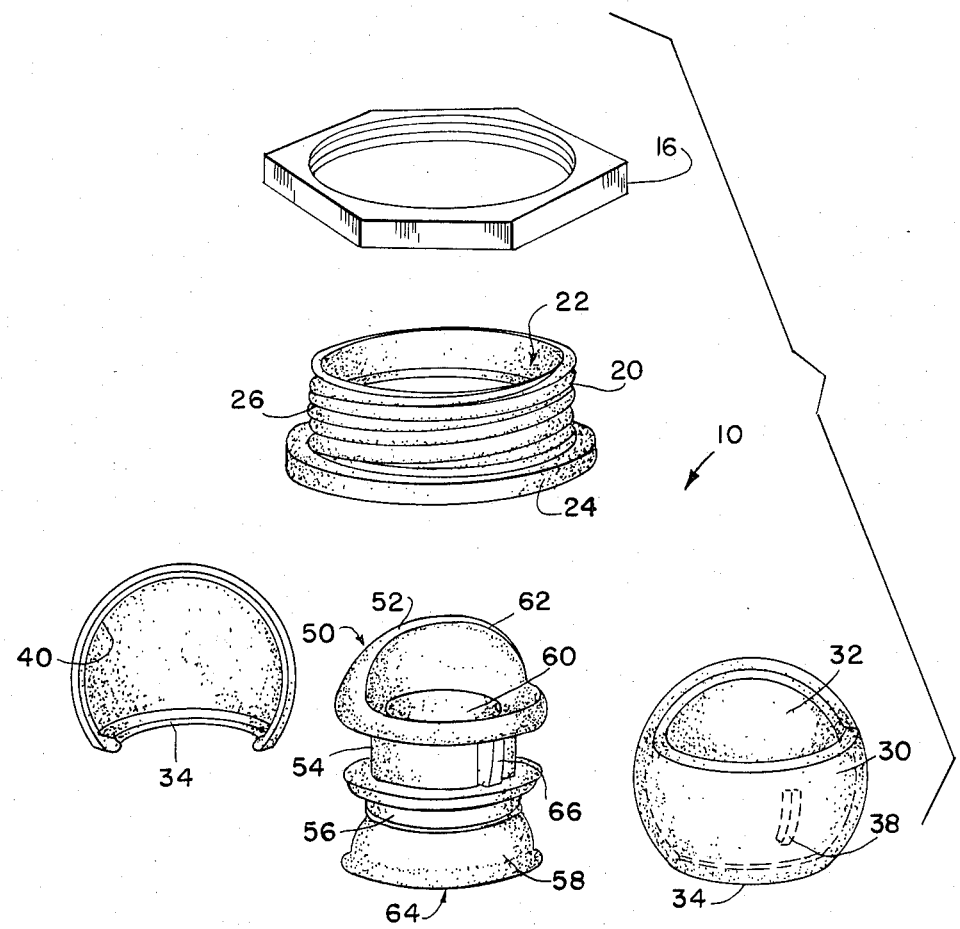
FIG. 1 is an exploded perspective view of a valve in accordance with the present invention.
Figure 2:
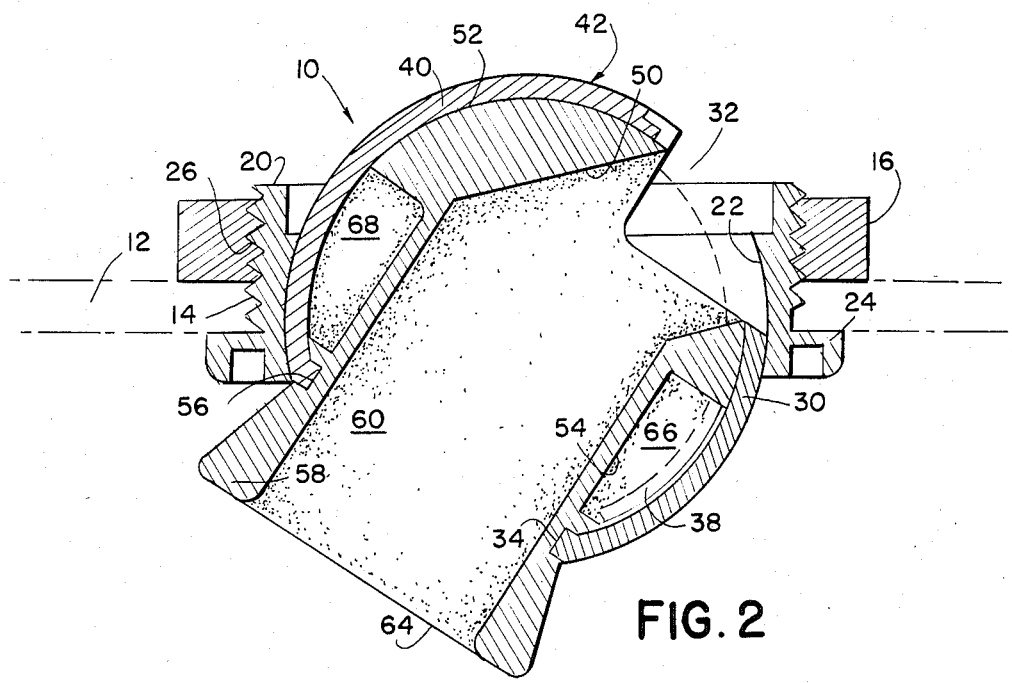
FIG. 2 is a side-sectional view of the valve of FIG. 1 illustrated in an open position, the valve being mounted to communicate with a plenum.
Figure 3:
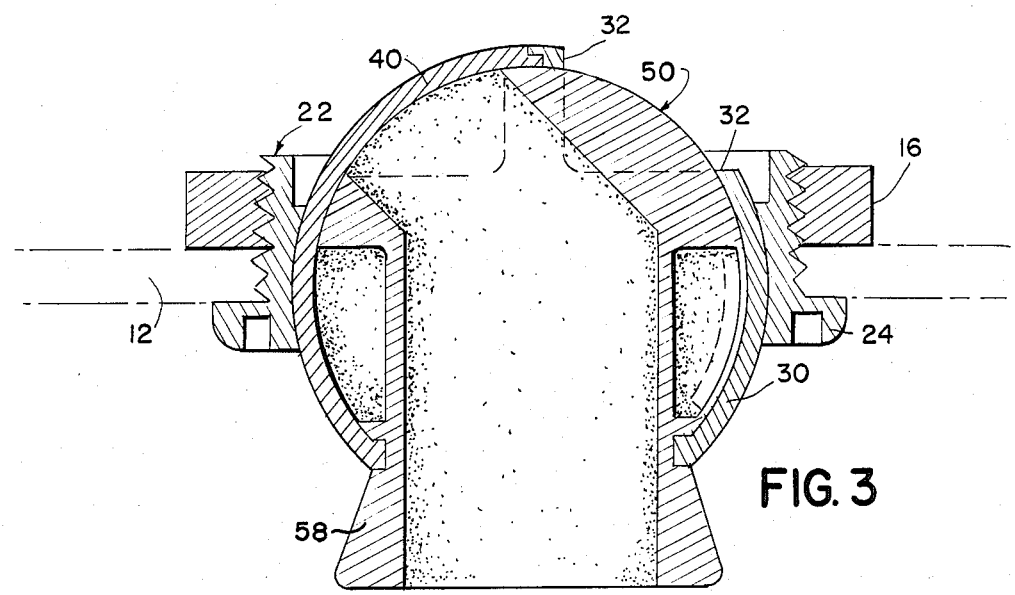
FIG. 3 is a side-sectional view of the apparatus of FIG. 2 wherein the valve is in a closed position but oriented to direct flow in a different direction than the direction of FIG. 2.

With reference to the drawing, wherein like numerals represent like parts throughout the several FIGURES, a valve in accordance with the invention is designated generally by the numeral 10. Valve 10 comprises a socket ring 20 which receives a spheroidal housing consisting of a pair of spheroidal housing sections 30 and 40. A valve body 50 is interiorly received in housing sections 30 and 40. With reference to FIGS. 2 and 3, valve 10 is adapted to be mounted in a fixed position in an opening of a panel 12 at the end of an air plenum or other source of pressurized gas. As further illustrated in the drawings, air valve 10 is generally adaptable for use in controlling the quantity of airflow and in directing the airflow from an air plenum generally above panel 12 to an interior space such as an aircraft cabin disposed generally below panel 12. The invention is also readily adaptable for use in providing an air valve for directing and controlling airflow in the passenger section of a bus, a train, or even an automobile.

Socket ring 20 has a generally concave surface 22 formed interiorly and extending circumferentially at the interior of the ring. Socket ring 20 is provided with a lower base peripheral flange 24 which is adapted to engage against the outer surface of panel 12 adjacent a plenum opening 14. An exterior threaded surface 26 of socket ring 20 is adapted for threading engagement with a complementary interior threaded portion of nut 16. Nut 16 is tightened on socket ring 20 so that nut 16 and flange 24 engage opposite surfaces of panel 12 to essentially mount valve 10 in fixed position at the end of an air plenum.

Spheroidal housing sections 30 and 40 mate, for example by a lap joint, to form a hollow shell 42 which may generally be described as a truncated spheroid having an aperture 32 at an upper angularly offset portion (as shown in the drawings) and having a lower substantially circular opening defined by a circular rim 34. The dimensions of shell 42 formed of sections 30 and 40 are such that shell 42 may be snapped into socket ring 20 in a manner wherein the interior concave surface 22 forms a ball and socket type engagement with a circumferentially extending portion of the outer surface of shell 42. Shell 42 is essentially universally angularly positionable in socket ring 20.

The interior of shell 42 defines a spheroidal surface which functions as a spheroidal socket for receiving valve body 50. Valve body 50 may be generally exteriorly described as having, from top to bottom as shown in the drawing, an upper spheroidal surface 52, an intermediate recessed portion 54, an adjacent circumferential groove 56, and a lower flared portion 58. A central generally longitudinal substantially elbow-shaped air passage 60 extends from an upper air inlet 62 to a lower air outlet 64. Valve body 50 is closely received in shell 42 and is axially rotatable therein about a central longitudinal axis A. Air inlet 62 is angularly offset from axis A. Air outlet 64 forms an opening generally normal to axis A and symmetric wih respect thereto. The spheroidal surface 52 of valve body 50 closely conforms to the interior spheroidal surface of shell 42. Rim 34 of shell 42 is slidably received in circumferential groove 56. Flared portion 58 extends outwardly from shell 42.

With referenced to FIG. 2, valve 10 is illustrated in the open position wherein shell aperture 32 and valve body inlet 62 are in alignment. In a preferred embodiment of the invention, aperture 32 and air inlet 62 are shaped and dimensioned to be substantially commensurate. In the open position of FIG. 2, pressurized air from an air plenum passes through the aperture 32, air inlet 62, air passage 60, and is discharged through air outlet 64 to the interior space of, for example, an aircraft cabin to be pressurized, in the general direction parallel to axis A. Axis A is also the axis of rotation of valve body 50 relative to shell 42.

With reference to FIG. 3 wherein air valve 10 is illustrated in a closed position, aperture 32 and inlet opening 62 are in a nonaligned position so that a portion of a spheroidal surface 52 of the valve body 50 essentially interiorly closes aperture 32. The interior spheroidal surface of shell 42 seals against the spheroidal surface of the valve body. Pressurized air in the air plenum is prevented from passing through air valve 10.

The pressurized air also acts to increase the integrity of the sealing engagement between surface 52 and the interior surface of shell 42. Because shell 42 is universally positionable in socket ring 20, there will be a multiplicity of air valve positions which are closed positions in the sense that air is prevented from passing through the air valve. For example, the relationship between shell 42 and valve body 50 as illustrated in FIG. 3 could be maintained while shell 42 and valve body 50 are rotated to another angular position relative to socket ring 20.

It should be appreciated that rotation of valve body 50 about axis A will result in the angular position of aperture 32 and air inlet 62 being relatively altered from a closed position such as shown in FIG. 3 to an open position. In the intermediate angular positions relative to axis A, not illustrated, pressurized air in the air plenum will communicate through aperture 32 and air inlet 62 to air passage 60 in quantities related to the angular position of the valve body 50 relative to shell 42. Thus, the rotation of valve body 50 relative to shell 42 provides an adjustable air valve means for controlling the quantity of air introduced into an interior space. The quantity of air is determined by the angular relationship between air inlet 62 and aperture 32.

Valve body 50 is also preferably provided with a pair of shoulders 66 and 68 which radially project from recessed portion 54. Shoulders 66 and 68 are engageable with a rib 38 which interiorly projects from shell 42. Shoulders 66 and 68 are located at opposing angular positions relative to axis A so that alternate engagement of each of the shoulders with rib 38 permits axial rotation of the valve body 50 relative to the shell 42 of approximately 180 degrees. The angular positions of rib 38 and shoulders 66 and 68 are selected so that the engagement of shoulder 68 against rib 38 forms a limit stop indicative of a closed position such as shown in FIG. 3 wherein no air flows through the air valve from the air plenum. The engagement of the opposite shoulder 66 against the rib 38 is indicative of a full open position as illustrated in FIG. 2 wherein a maximum quantity of air flows through the air valve. The adjective "full" was employed because, as previously described, rotation of the valve body will result in a continuum of positions wherein various selected quantities of air flow through the valve.

The flared portion 58 of valve body 50 is adaptable for manual axial rotation (about axis A) of the valve body relative to the shell to provide an efficient means for controlling the quantity of air exiting air outlet 64. In addition, the flared portion 58 may be manually employed for rotating shell 42 relative to socket ring 20 to thereby selectively direct the airflow to a specific location or region in the interior air space of a cabin or the like. It should be appreciated that there are no protrusions or other mechanical interruptions of the air channel from the air plenum to the air outlet 64 which, in combination with the passing of pressurized air, would result in a whistling effect or other noisy disturbance. In addition, it is noted that air valve 10 in accordance with the present invention may be manufactured with as few as four separate components. Preferably the components are manufactured of plastic material. Socket ring may be manufactured of a polycarbonate material having sufficient resilience to yieldingly receive housing sections 30 and 40 which may molded from Lexan. Molded Delrin is a suitable material for valve body 50. All of the foregoing components are preferably molded of a plastic material so that condensation of moisture on the components is essentially eliminated. Nut 16 may be formed of aluminum. In an alternate form of the invention, the aluminum nut 16 may be provided with a skirt (not shown) wherein an air manifold or hose engages the skirt and is clamped in place.

The foregoing description is set forth for purposes of illustration and should not be deemed a limitation of the present invention. Accordingly, various modifications, alternatives, and adaptations of the present invention may occur to one skilled in the art without departing from the spirit and scope of the present invention.

What is claimed is:

1. An air flow control valve for use in establishing fluid communication between a source of pressurized air and an enclosure, said valve comprising:

socket defining means, said socket defining means having a pair of oppositely disposed openings which lie in parallel planes, said openings being symmetrical with respect to a first axis which is transverse to said planes, said socket defining means further having a concave interior bearing surface which is symmetrical with respect to said first axis;

housing means, said housing means consisting of a pair of interlocking shell-defining members, said shell-defining members cooperating to form a thin-walled hollow shell having a generally truncated spheroidal interior shape and an external shape which is at least in part complementary to that of said socket defining means interior bearing surface whereby said housing means is rotatably supported in said socket defining means, said shell having an interior locking surface portion which deviates from said spheroidal interior shape, said shell further having a circular shaped discharge port extending through the wall thereof, said discharge port lying in a plane, the valve having a directional axis which is transverse to the plane of said discharge port and coaxial therewith, said directional axis passing through the center of the sphere defined by said members, said shell also having an inlet port extending through the wall thereof, said inlet port being spacially displaced from said discharge port and being off-set with respect to said directional axis; and a valve body movably supported within said housing means, at least a portion of said valve body having an exterior shape which complements the spheroidal interior shape of said housing means shell, said valve body defining a single unimpeded non-linear air flow passage which extends between an inlet port and a discharge port, a first portion of said passage being co-axial with said directional axis, said valve body discharge port being in alignment with said housing means shell discharge port, a second portion of said air flow passage having an axis which angularly intersects said directional axis, said air flow passage second portion terminating at said valve body inlet port, said valve body further including an exterior surface irregularity which engages said housing means shell locking surface to limit the relative motion between said valve body and said housing means to rotation about said directional axis, rotation of said valve body about said directional axis permitting the degree of overlap of said valve body inlet port and said housing means shell inlet port to be varied to thereby vary the rate of flow through the valve, application of a force having a component which is transverse to said directional axis to said valve body causing simultaneous rotation of said housing means and valve body to vary the relative angular orientation of said first and directional axes between the condition of alignment and various degrees of non-alignment to thereby selectively direct the air discharged from said valve body discharge port.

2. The valve of claim 1 wherein said air flow passage has a constant cross-sectional area.

3. The valve of claim 1 wherein said air flow passage is substantially elbow-shaped.

4. The valve of claim 1 wherein said housing means interior locking surface portion comprises an annular rim which extends about the periphery of said housing means shell discharge port and wherein said valve body exterior surface irregularity comprises a groove which is complementary in shape to said rim.

5. The valve of claim 1 further comprising:
means for limiting the rotation of said valve body about said directional axis whereby said valve body inlet port and housing means shell inlet ports may be placed in registration in a maximum flow position and may be completely out of registration in a closed position.

6. The valve of claim 5 wherein said means for limiting axial rotation comprises:
a pair of oppositely positioned stops projecting outwardly from said valve body; and
a rib projecting from the interior surface of said housing means shell, said rib being positioned to cooperate with said stops.

7. The valve of claim 1 wherein said shell-defining members cooperate to define said shell discharge port and wherein said shell inlet port is formed in one of said shell-defining members.

8. The valve of claim 1 wherein a portion of said valve body extends through said housing means shell discharge port, said valve body discharge port being positioned downstream in the direction of flow from said housing means shell discharge port.

9. The valve of claim 1 wherein said housing means shell external shape is spheroidal.

10. The valve of claim 1 wherein said socket defining means is a ring-like member having a peripheral flange and an external threaded portion.

11. The valve of claim 10 wherein said air flow passage is substantially elbow-shaped.

12. The valve of claim 11 wherein said shell-defining members cooperate to define said shell discharge port and wherein said shell inlet port is formed in one of said shell-defining members.

13. The valve of claim 12 wherein said housing means interior locking surface portion comprises an annular rim which extends about the periphery of said housing means shell discharge port and wherein said valve body exterior surface irregularity comprises a groove which is complementary in shape to said rim.

14. The valve of claim 13 wherein a portion of said valve body extends through said housing means shell discharge port, said valve body discharge port being positioned downstream in the direction of flow from said housing means shell discharge port.

15. The valve of claim 14 further comprising:
means for limiting the rotation of said valve body about said directional axis whereby said valve body inlet port and housing means shell inlet ports may be placed in registration in a maximum flow position and may be completely out of registration in a closed position.

16. The valve of claim 15 wherein said means for limiting axial rotation comprises:
a pair of oppositely positioned stops projecting outwardly from said valve body; and
a rib projecting from the interior surface of said housing means shell, said rib being positioned to cooperate with said stops.

17. The valve of claim 16 wherein said socket defining means is a ring-like member having a peripheral flange and an external threaded portion.

* * * * *